(12) United States Patent
Solhjell

(10) Patent No.: US 7,161,756 B2
(45) Date of Patent: Jan. 9, 2007

(54) METHOD AND SYSTEM FOR COMMUNICATION BETWEEN A TAPE DRIVE AND AN EXTERNAL DEVICE

(75) Inventor: Erik Solhjell, Oslo (NO)

(73) Assignee: Tandberg Data Storage ASA, Oslo (NO)

( * ) Notice: Subject to any disclaimer, the term of this patent is extended or adjusted under 35 U.S.C. 154(b) by 195 days.

(21) Appl. No.: 10/842,695

(22) Filed: May 10, 2004

(65) Prior Publication Data

US 2005/0248880 A1  Nov. 10, 2005

(51) Int. Cl.
*G11B 5/02* (2006.01)

(52) U.S. Cl. ....................................... 360/55
(58) Field of Classification Search ...... None
See application file for complete search history.

(56) References Cited

U.S. PATENT DOCUMENTS

| | | | |
|---|---|---|---|
| 5,321,817 A * | 6/1994 | Feinstein | 703/25 |
| 6,026,454 A | 2/2000 | Hauck et al. | |
| 6,039,260 A | 3/2000 | Eisele | |
| 6,097,594 A | 8/2000 | Bassett et al. | |
| 6,571,205 B1 | 5/2003 | Doucet et al. | |
| 6,799,230 B1 * | 9/2004 | Sugiyama et al. | 710/62 |
| 6,831,837 B1 * | 12/2004 | Chang | 361/715 |
| 2004/0088456 A1 * | 5/2004 | Zhang | 710/74 |

\* cited by examiner

*Primary Examiner*—K. Wong
(74) *Attorney, Agent, or Firm*—Schiff Hardin LLP

(57) ABSTRACT

A tape drive has a front panel with an opening therein for receiving tape cartridges, and contains tape drive electronics. For transferring data into and out the tape drive electronics, the tape drive electronics includes a USB or Firewire serial data port, and the front panel of the tape drive has an access opening therein, behind which the serial port is mounted, so that a serial cable connector can be plugged into the serial port from the front panel of the tape drive. Alternatively, a data transfer cartridge can be inserted into the opening of the tape drive that is normally used for tape cartridges, the data transfer cartridge having a front side that is accessible via the opening in the front panel of the drive, and a USB or Firewire connector is disposed in the front side of the data transfer cartridge. A connector at the rear side of the data transfer cartridge communicates with the serial port at the front side, and mates with a connector in the tape drive when the data transfer cartridge is inserted therein.

6 Claims, 3 Drawing Sheets

METHOD AND SYSTEM FOR COMMUNICATION BETWEEN A TAPE DRIVE AND AN EXTERNAL DEVICE

BACKGROUND OF THE INVENTION

1. Field of the Invention

The present invention relates to tape drives and tape drive system, as well as to methods for operating tape drive and tape drive systems, wherein communication takes place between a tape drive and an external device.

2. Description of the Prior Art

Modern tape drives typically contain an internal microprocessor, and sometimes several internal microprocessors, for controlling the operation of the tape drive. Program software for running such microprocessors typically is stored in a non-volatile, programmable memory, either disposed directly within the microprocessor, or connected to an accessible by the microprocessor. For many years, the conventional non-volatile memory type that has been used for this purpose has either been a "write-once" type (PROM) or a "write-externally" type (E-PROM). The latter memory type requires special external equipment in order for the contents thereof to be erased and re-written.

Recently, however, tape drives have been equipped with one or more program memories in the form of a "flash memory" with associated electronics. This type of memory permits a currently-stored program to be erased, and a new program to be loaded, into the memory many times, with the memory being fixed inside the tape drive. In this manner, the tape drive can be upgraded with new program software, even several years after the tape drive was originally built and the original software installed.

FIG. 1 shows a block diagram of the basic components of such a tape drive. The tape drive includes a microprocessor 112 that controls the entire operation of the drive. A program for operating the microprocessor 112 is loaded into a non-volatile flash memory 105, and is supplied to the microprocessor 112 via a program bus 106.

A host computer can be connected with the tape drive, as needed, via an interface connector 109, which is in turn connected to an interface bus 114 leading to an interface controller 110. Conventional modern tape drives normally employ one of two types of interfaces, namely SCSI or Fibre Channel. Commands and data from the host computer are transferred via the interface connector 109, the interface bus 114 and the interface controller 110 to the internal tape drive data bus 107. The internal tape drive data bus 107 distributes the data and commands appropriately throughout the tape drive, controlled by the microprocessor 112.

Data to be written by the tape drive are transferred via the interface 109, the interface bus 114 and the interface controller 110 to a data memory 111, before being written on a tape under the control of the microprocessor 112. Similarly, data that have been read from a tape are first loaded into the data memory 111, before being transferred to the host computer via the interface controller 110, the interface bus 114 and the interface connector 109, also under the control of the microprocessor 112.

For clarity and simplicity, the read/write and motor portion of the tape drive electronics are not shown in FIG. 1, nor are the control signals from the microprocessor 112, that are used to control the various components of the tape drive electronics. These features are well known to those of ordinary skill in the field of tape drive design, and need not be explained in detail.

In addition to the interface connector 119, serving as a port to the host computer, most modern tape drives have a serial port, which is always located at the back panel of the drive. A tape drive is designed to be installed in a rack or other type of cabinetry or shelving, and thus has a clearly distinguishable front panel, which will be accessible from the front of the rack in which the tape drive is disposed, and a rear panel, opposite to the front panel, which will be hidden from view from the front when the tape drive is disposed in the rack. Typically, access to the rear panel of the tape drive requires removal of the tape drive from the rack.

The aforementioned serial port serves several functions, one being to load the program code into the flash memory 105, for operating the microprocessor 112. As noted above, this program code is installed at the time of manufacture of the tape drive, but it also may be necessary or desirable to load new program code into the flash memory 105 after the tape drive has been installed in the rack.

To load the program code into the tape drive, a computer containing the appropriate code and the necessary support programs is connected via a serial cable to the aforementioned serial port of the tape drive, which is designated with the reference numeral 100 in FIG. 1. Almost all currently available tape drives employ the RS 232-type serial port as the serial port 100. The program code is then transferred serially from the serial port 100 via a cable 113 to a serial controller 101. In the serial controller 101, the code typically is converted into parallel bytes, and is transferred via a bus 102 to a flash memory controller 103. The flash memory controller 103 controls transfer of the program code and the associated control information into the flash memory 105 via a bus 104. As noted above, this procedure is employed to load program data not only during manufacture of the tape drive, but also during servicing or updating of the tape drive, for loading new program code into an installed tape drive at the customer site.

As tape formats and tape drive operations become increasingly sophisticated, there is need to design a tape drive that can record and store essential information when an error situation occurs. Such error situations can range from a misreading of a data block or a portion of a data block to situations where the tape drive, for example, has lost control of the actual position on the tape. Typical information associated with such error situations that can be logged includes the sequence of commands received from the host computer system prior to the error situation, the timing of these commands, responses to these commands such as changes in motor speed, tape direction, tape tension, etc., as well as information from the read/write channel related to signal performance or the length of any drop-outs, as well as information from the servo-system that controls the head position relative to the tape. Since there is a wide variety of different failures that can lead a series of different error situations, it is important for the tape drive to be able to provide a service technician with as many details as possible about the overall operation of the tape drive prior to the occurrence of the error situation.

For this purpose, modern tape drives contain a non-volatile memory, designated as an error memory 115 in FIG. 1, which may also be a flash memory. Information of the above-described type is recorded in the error memory 115. Although this adds to the cost and complexity of the tape drive, it improves the chances of detecting the underlying reason for even very complex error situations. The error memory 115 is controlled by the microprocessor 112. When an error situation occurs, the microprocessor 112 can enter special information bytes in the error memory 115. These information bytes can provide information about the sequence of commands prior to the occurrence of the error situation, the actual position and performance of the tape, and other relevant information that may assist a service technician.

To utilize the benefits of the error history log stored in the error memory 115, the service technician must connect a diagnostic and test system to the tape drive via the RS232-type serial port 110 located at the back of the tape drive. This normally requires opening the cabinet or other enclosure wherein the tape is mounted, and connecting a serial cable from the computer of the test and diagnostic system to the tape drive via this serial port 100. The service technician then operates the computer of the test and diagnostic system to send appropriate program code through the serial port 100 in order to transfer the error log information from the error memory 115 via the internal data bus 107 to a data error controller 108. From the data error controller 108, the error log information proceed through the serial controller 101, the bus 113, and the serial port 100 to the service technician's computer.

Sending a service technician to the customer's site for an on-site analysis and correction of an error situation can be expensive and time consuming. Moreover, if the error situation is serious enough to preclude further operation of the tape drive until the error is corrected, the tape drive is unavailable for use until a service appointment can be scheduled and the servicing completed.

SUMMARY OF THE INVENTION

It is an object of the present invention to provide a tape drive system, that includes a tape drive and an external device, such as a testing and diagnostic computer, wherein information, such as the aforementioned logged error information, can be downloaded from the tape drive by a user of the tape drive, without the need for the intervention of a service technician.

It is also an object of the present invention to provide a method for operating such a tape drive system which allows user-downloading of information from the tape drive without the intervention of a service technician.

As noted above, one reason why users of conventional tape drives have been unable, or reluctant, to undertake downloading of such information themselves is because the serial port necessary for such downloading is located at the rear of the tape drive, necessitating a relatively time consuming, and sometimes complicated, removal of the tape drive from its cabinet or rack. The system and method of the present invention solve this problem by equipping the front of a tape drive of such a tape drive system with a standardized serial port, so as to allow the user and easy and reliable connection to the tape drive for the aforementioned purposes. In order to accomplish, this it is important to use a type of serial port which is popular and well-known in the industry. Although the aforementioned RS323-type serial port is still popular and connecting cables for such a serial port are widely available, it is physically fairly large and difficult to integrate into the front panel of a tape drive, which typically has relatively small dimensions. Moreover, such a serial port is not modern as to its structure, i.e. with respect to the mode of software operation. More modern commercially-available serial ports, such as the USB port and the Firewire (IEEE-1394) port have contacts that are physically much smaller compared to the RS232-type port, so that such a serial port can blend more easily into the appearance of the front panel of a tape drive, or may even be placed behind a small door in the front panel. Moreover, these more modern types of serial ports are specified with a more sophisticated, higher level operating/control system, which allows better control of the overall data transfer operation using such a port. Such ports also have significantly higher data transfer rates than an RS232-type port.

Alternatively, a data transfer cartridge can be inserted into the opening of the tape drive that is normally used for tape cartridges, the data transfer cartridge having a front side that is accessible via the opening in the front panel of the drive, and a USB or Firewire connector is disposed in the front side of the data transfer cartridge. A connector at the rear side of the data transfer cartridge communicates with the serial port at the front side, and mates with a connector in the tape drive when the data transfer cartridge is inserted therein.

DESCRIPTION OF THE PREFERRED EMBODIMENTS

The basis of the present invention is to equip the front panel of a tape drive, or the front side of a tape cartridge, with a standardized serial port for allowing a user an easy and reliable connection to the tape drive for data transfer between the tape drive and an external device.

Figure 2:
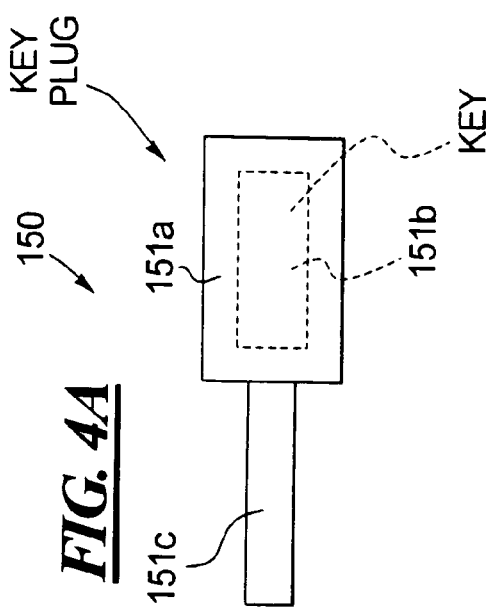
FIG. 2 is a front elevational view of the front panel of a tape drive for a tape drive system constructed and operating in accordance with the principles of the present invention.

FIG. 2 shows the front panel 120 of a tape drive, having an opening 123 therein for an integrated USB port (type B). This connector is small and can be easily integrated into the front panel 120 of the tape drive. The opening 23 can be provided with a small cover, if desired, to hide the serial port behind the opening 123 when not in use. A Firewire (IEEE-1394) port is of similar size, and also can be used as the serial port in accordance with the invention.

The front panel 120 typically has an eject button 122, one or more LED indicators 124, and an air intake opening 125. With this arrangement, the user can easily plug a USB cable from the user's computer into the USB port at the opening 123, without having to remove the tape drive from the system in which it is installed, and without having to open the system at all. This allows the user to download data from the tape drive, such as the aforementioned logged error data. Even if the user, or the user's computer, does not have the capability for testing and diagnosis based on this logged data, the user can transfer the data in an appropriate manner (for example via the Internet or by transfer to a floppy disk and mailing of the floppy disk) to a service technician at a remote location from the user. The service technician can then analyze the data and recommend appropriate correction procedures, which the user may be able to undertake without the necessity of a service call by the technician.

Even if a service call is necessary, the location of the opening 123 and the serial port therebehind at the front panel of the tape drive makes downloading of the aforementioned data by the service technician easier as well. This reduces the time, and therefore the cost, associated with a service call.

Figure 3:
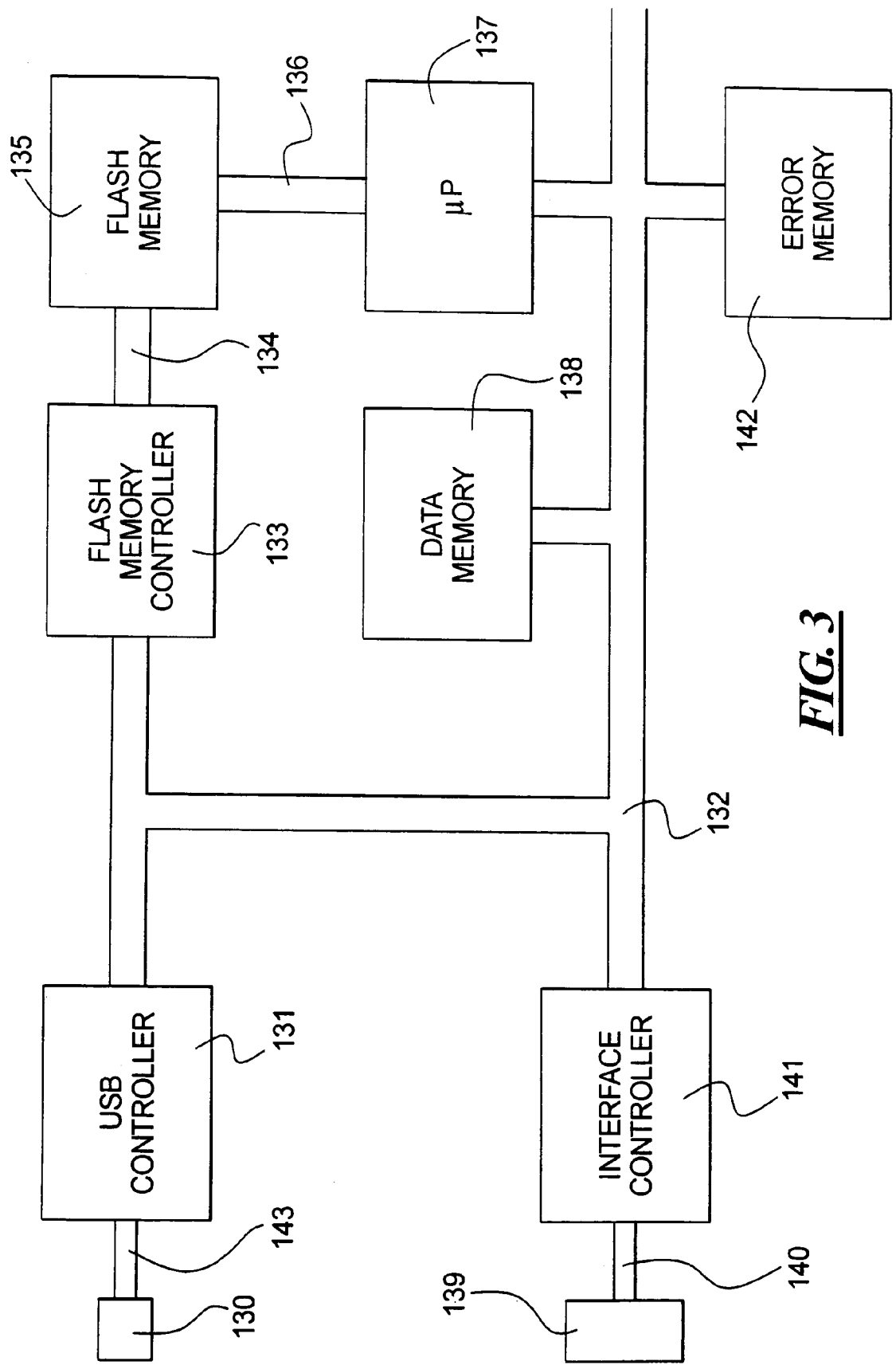
FIG. 3 is a block diagram of the basic components of a tape drive constructed and operating in accordance with the present invention.

FIG. 3 is a block diagram showing the basic components of a tape drive using a USB serial connector in accordance with the invention. The tape drive has a USB port 130 connected via a bus 143 to a USB controller 131. The USB controller is connected to an internal data bus 132 of the tape drive. The internal data bus 132 also is connected to a flash memory controller 133 and to a microprocessor 137, a data memory 138, an interface controller 141 and an error memory 142.

Figure 1:
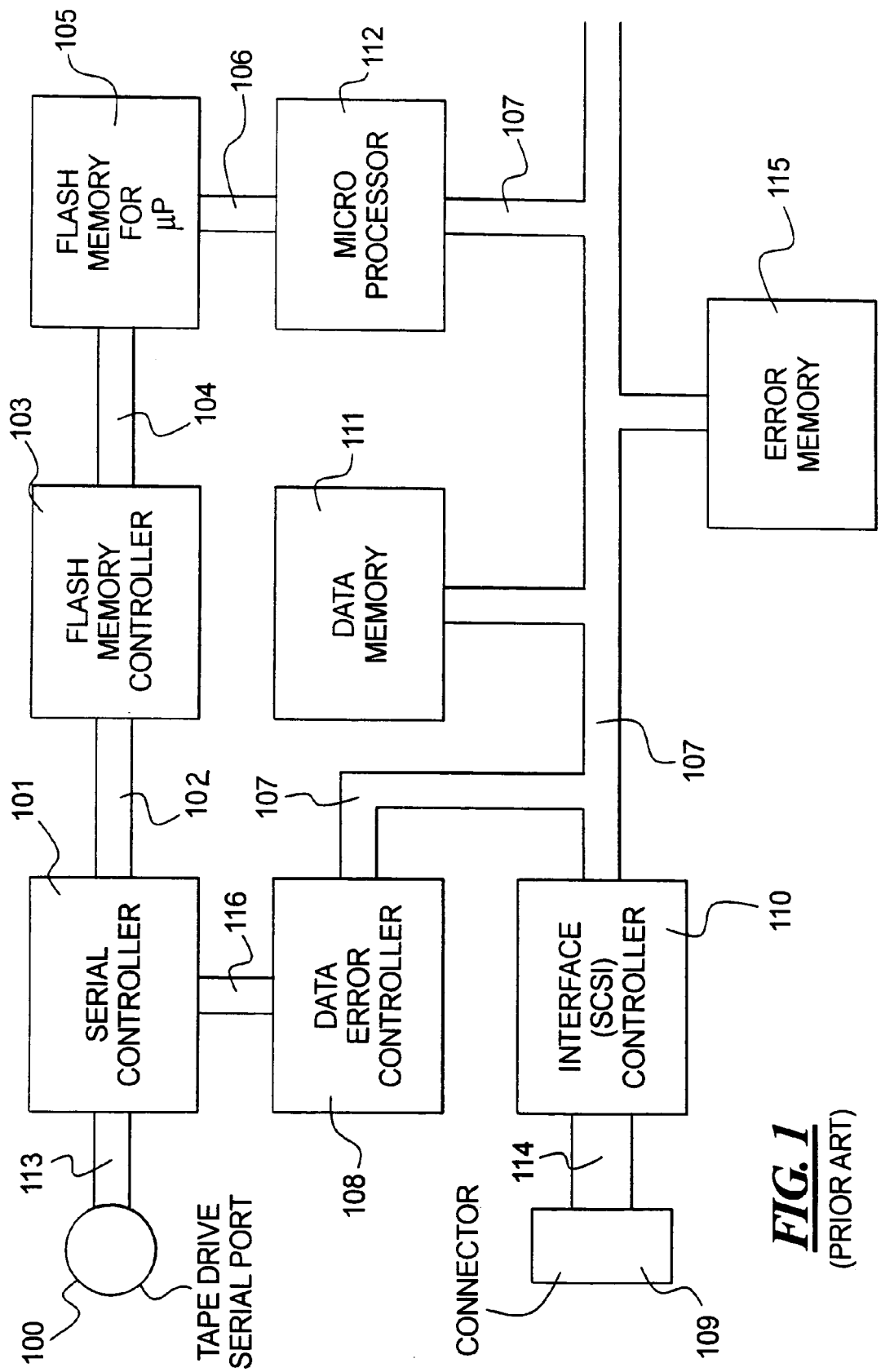
FIG. 1, as discussed above, is a block diagram of the components of a known tape drive.

The operation of these latter components is fundamentally the same as described earlier in connection with FIG. 1. To update (or load for the first time) the contents of the flash memory 135, the external computer (external device) containing the program code is connected to the tape drive via the USB port 130. The USB controller 131 detects and acknowledges that the external computer is connected to the USB port 130, and the transfer of the program code then can take place (from the external computer via the USB port 130, the bus 143, the USB controller 131, the data bus 132, to the flash memory controller 133). The flash memory controller 133 then writes the program code into the flash memory 135 via the bus 134.

To read out information from the error memory 142, the external computer is connected to the USB port 130, and this is detected and acknowledged by the USB controller 131. The external computer then emits a request for data transfer from the error memory 142. The error information bytes and then transferred via the data bus 132 to the USB controller 131, and then to the external computer via the bus 143 and the USB connector 130.

There may be a concern associated with having the opening 123 for the serial connector at the front panel 120 of the tape drive, with respect to this location affording a more inviting opportunity for unauthorized access to the computer system of which the tape drive is a component, compared to the conventional difficult-to-access rear-mounted port. Of course, unauthorized access still can be gained via the conventional rear-mounted port, however, as noted above this would normally require opening the cabinet or enclosure in which the tape drive is mounted, and typically such an enclosure will be equipped with locks or electronic security to prevent unauthorized opening thereof.

This concern can be alleviated in accordance with the invention either electronically or mechanically. Electronic security can be provided by requiring a user, who has inserted a connector into the serial port behind the opening 123, to enter a password before the USB controller will permit access to any "deeper" components of the tape drive or its associated computer system.

Figure 4A:
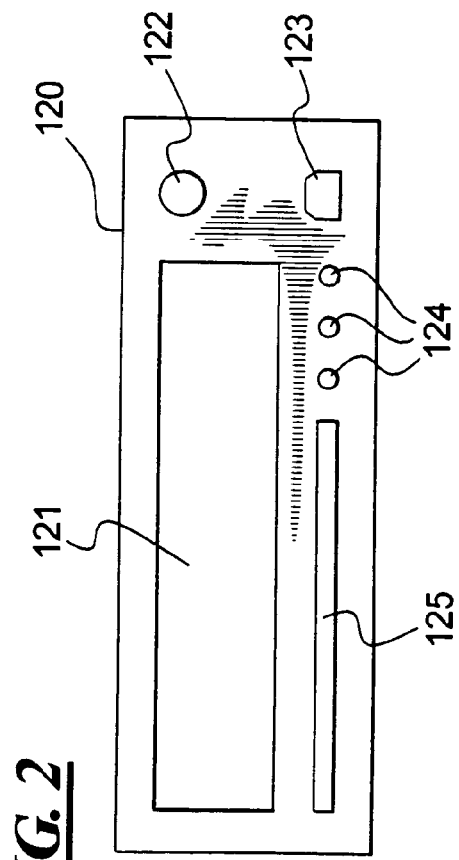
FIG. 4A schematically illustrates a key device or key plug for insertion into the serial port of a tape drive constructed and operating in accordance with the invention.

A mechanical embodiment for providing such security is to provide a key device or key plug 150 which can be plugged into the serial port behind the opening 123 in the front panel 120. Such a key plug 150 is shown in FIG. 4A, and has a key body 151a containing key electronics 151b, and a connector 151c. The connector 151c is electronically connected to the key electronics 151b, and mechanically fits into the opening 123 for making an electrical connection between the USB port of the tape drive and the key electronics 151b.

Figure 4B:
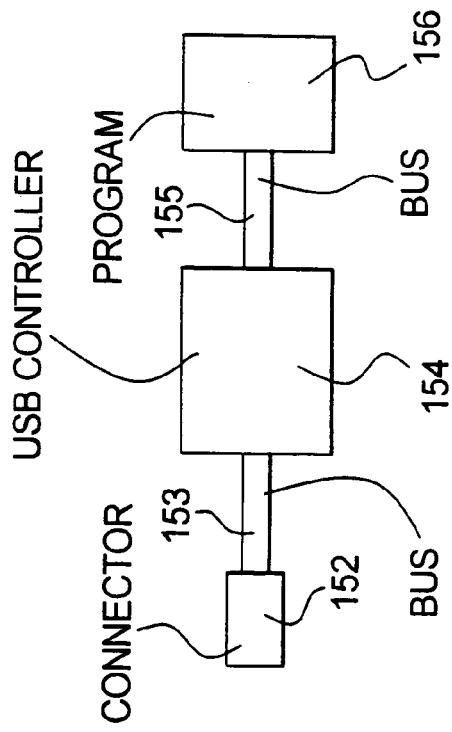
FIG. 4B is a block diagram of the basic components of the key electronics in the key device or key pug of FIG. 4A.

FIG. 4B is a block diagram of the basic components of the tape drive for interacting with the key plug 150. The key plug 150 is inserted into the opening 123 the front panel 120 (FIG. 2) and mechanically and electronically interfaces with a connector 152, which is connected via a bus 153 to a USB controller 154. The USB controller, in turn, is connected via a bus 155 so as to have access to a program 156 which may be integrated into a small microcontroller. During manufacturing, this microcontroller or program 156 is programmed to provide a special password to the USB controller 154 whenever the key plug 150 is connected via the connector 152 to the tape drive. It is of course possible to integrate the program 156 into the USB controller, in which case the components shown in FIG. 4B will be the connector 130, the bus 143 and the USB controller 131 of FIG. 3.

The password provided by the program 156 enables the USB controller 154 (or 131) to allow transfer of information into or out of the tape drive. The user then unplugs the key plug 150 and plugs in the USB cable into the opening 123. It is possible to provide an additional level of security by still requiring the user to enter a password, as described above. Therefore, in order to effect data transfer into or out of the tape drive, the user must not only be in possession of an appropriate key plug, but must also be able to enter the correct password after the cable connection is made.

When the user has been authenticated, the transfer of data, such as transferring logged error data out of the tape drive to an external computer, can ensue automatically, controlled by a software program in the external computer. This program can allow the logged error data to be transferred directly by phone or via an e-mail/internet connection to a remote location at which an appropriate testing and diagnostic computer is located. The user can thus automatically or manually be given information for correcting the error situation without (in many cases) the need for a call from a service technician.

Software program updating of the tape drive can be undertaken in the same manner, directly from a remote computer without the need for a service call.

Figure 5:
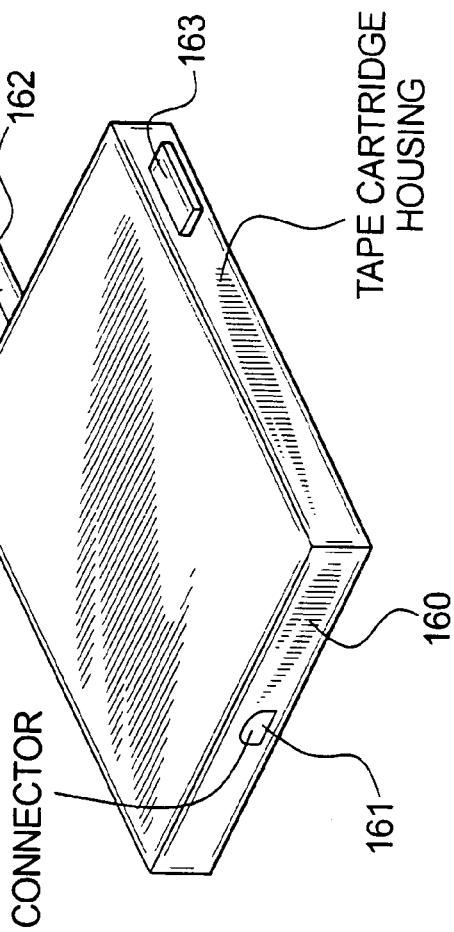
FIG. 5 is a perspective view of a tape cartridge having a serial port in a front side thereof, constructed and operating in accordance with the present invention.

An alternative to placing the USB or Firewire connector at the front panel of the tape drive is to place it at the front side of a cartridge housing of a cartridge that can be inserted in the opening 121 of the tape drive. Such a cartridge having a cartridge housing 160 is shown in FIG. 5. The cartridge housing 160 has a form factor conforming to the cartridge housing of a conventional tape cartridge used during the normal operation of the tape drive for data transfer between the drive and a tape in the cartridge. The cartridge shown in FIG. 5 has a front side that is accessible via the opening 121 in the front panel 120. In this front side, a USB connector 161 is disposed. At the back of the cartridge housing 160 (i.e., the side that is inside of the tape drive when the cartridge shown in FIG. 5 is inserted therein) a connector 162 is provided, which plugs into a corresponding connector inside of the tape drive. The connector 161 is electronically linked to the connector 162. The connector 162 communicates with the USB controller 131, so that when a USB cable is inserted into the USB connector 161 at the front side of the cartridge, the aforementioned data transfer to and from the tape drive can take place.

In order to ensure that all connections are properly mechanically aligned, the cartridge housing shown in FIG. 5 has a mechanical configuration so that it can only be inserted with the proper orientation in the tape drive. This mechanical configuration can be effected in many ways, with a protruding element 163 being shown in FIG. 5 as one example. This protruding element 163 also can interact with mechanical levers or other sensors in the tape drive to inform the tape drive that the cartridge housing 160 is not a "normal" tape cartridge. This will override the normal procedures that the tape drive would otherwise try to initiate for loading a tape cartridge therein.

When the user or a service technician wants to read the logged error data or update the tape drive program, the service technician or user plugs the cartridge shown in FIG. 5 into the opening 121 of the tape drive, and connects an external computer to the USB connector 161 in the same way as for connection via the opening 123 described above. Data transfer then takes place in the same manner as described above.

Although modifications and changes may be suggested by those skilled in the art, it is the intention of the inventor to embody within the patent warranted hereon all changes and modifications as reasonably and properly come within the scope of his contribution to the art.

I claim as my invention:

1. A tape drive system comprising:
    a tape drive having a housing with a front panel with an opening therein adapted to receive data cartridges;
    a data cartridge having a front side and an opposite rear side, said data cartridge also being insertable into said opening of said front panel and, when inserted into and received in said opening in said front panel, said front side being accessible via said opening in said front panel;
    said data cartridge having a standardized serial port disposed in said front side selected from the group consisting of a standardized USB port and a standardized Firewire port and having an electrical connector projecting from said rear side in data-transferring communication with said standardized serial port in said front side; and
    tape drive components disposed in said tape drive housing including a further connector for mating with said connector projecting from said rear side of said data transfer cartridge when said data transfer cartridge is received in said opening of said front panel, and said tape drive electronics including a serial controller connected to said connector of said tape drive electronics for effecting transfer of data between said tape drive electronics and standardized said serial port at said front side of said data transfer cartridge.

2. A tape drive system as claimed in claim 1 wherein said housing of said data transfer cartridge has a mechanical configuration indicating that said data transfer cartridge is not a tape cartridge.

3. A tape drive system as claimed in claim 2 wherein said mechanical configuration is a projection projecting from an exterior of said data transfer cartridge housing.

4. A method for transferring data into or from a tape device having a housing with a front panel with an opening therein adapted to receive data cartridges, comprising the steps of:
    inserting a data cartridge having a front side and an opposite rear side into said opening of said front panel, and leaving said front side accessible via said opening in said front panel when said data cartridge is inserted into and received in said opening in said front panel;
    disposing a standardized serial port in said front side of said data cartridge selected from the group consisting of a standardized USB port and a standardized Firewire port and providing an electrical connector projecting from said rear side in data-transferring communication with said standardized serial port in said front side;
    in said tape drive housing, providing a further connector for mating with said connector projecting from said rear side of said data transfer cartridge when said data transfer cartridge is received in said opening of said front panel; and
    disposing a serial controller in said tape drive connected to said connector and transferring data between said serial controller and said serial port via said front side of said data transfer cartridge.

5. A method as claimed in claim 4 comprising providing said housing of said data transfer cartridge with a mechanical configuration indicating that said data transfer cartridge is not a tape cartridge.

6. A method as claimed in claim 5 comprising providing, as said mechanical configuration, a projection projecting from an exterior of said data transfer cartridge housing.

* * * * *